(12) United States Patent
Park et al.

(10) Patent No.: US 7,365,803 B2
(45) Date of Patent: Apr. 29, 2008

(54) METHOD FOR MARKING LABEL OF EXTERNAL AV APPARATUS AND APPARATUS USING THE SAME

(75) Inventors: Tae Jin Park, Sungnam-si (KR); Man Sik Choi, Gwacheon-si (KR)

(73) Assignee: LG Electronics Inc., Seoul (KR)

( * ) Notice: Subject to any disclaimer, the term of this patent is extended or adjusted under 35 U.S.C. 154(b) by 403 days.

(21) Appl. No.: 10/864,436

(22) Filed: Jun. 10, 2004

(65) Prior Publication Data
US 2004/0252237 A1 Dec. 16, 2004

(30) Foreign Application Priority Data
Jun. 12, 2003 (KR) ............ 10-2003-0037793

(51) Int. Cl.
*H04N 5/268* (2006.01)
*H04N 5/50* (2006.01)
(52) U.S. Cl. .................. 348/705; 348/569
(58) Field of Classification Search ........ 348/705, 348/706, 731–734, 552–558, 569, 570
See application file for complete search history.

(56) References Cited

U.S. PATENT DOCUMENTS 5,253,067 A * 10/1993 Chaney et al. ........... 348/570
5,528,304 A * 6/1996 Cherrick et al. .......... 725/41
6,122,018 A * 9/2000 Sugihara et al. .......... 348/705
6,753,928 B1 * 6/2004 Gospel et al. ........... 348/569
2004/0194132 A1 * 9/2004 Kawashima et al. ...... 725/37

FOREIGN PATENT DOCUMENTS

CN 1343917 4/2002
JP 03110980 A * 5/1991

* cited by examiner

*Primary Examiner*—M. Lee
(74) *Attorney, Agent, or Firm*—Birch, Stewart, Kolasch & Birch, LLP (57) ABSTRACT

A method for marking a label of an external AV apparatus of the present invention includes displaying an external AV signal outputted from the external AV apparatus of the plurality of external AV apparatuses, and setting and displaying one label of an external AV signal using a label setting signal including a plurality of labels stored beforehand. Accordingly, a user can easily select and watch an external AV signal of the desired external AV apparatus through the label of the external AV apparatus.

11 Claims, 7 Drawing Sheets

METHOD FOR MARKING LABEL OF EXTERNAL AV APPARATUS AND APPARATUS USING THE SAME

This Nonprovisional application claims priority under 35 U.S.C. § 119(a) on Patent Application No(s). 10-2003-0037793 filed in KOREA on Jun. 12, 2003, the entire contents of which are hereby incorporated by reference.

BACKGROUND OF THE INVENTION

1. Field of the Invention

The present invention relates to an image display apparatus, and more particularly, to a method for marking a label of an external AV apparatus that informs of a kind of the external AV apparatus, and an apparatus using the same.

2. Description of the Related Art

Various external AV apparatuses are connected to an image display apparatus such as a television set and a computer monitor. The external AV apparatuses include a videocassette tape recorder (VCR), a digital versatile disc player (DVDP), a digital video home system (DVHS), a personal video recorder (PVR), a camcorder and a game machine. The image display apparatus is provided with external input terminals for connecting to the external AV apparatuses. Accordingly, AV signals outputted from the external AV apparatus can be inputted through the external input terminals and processed in the image display apparatus.

Figure 1:
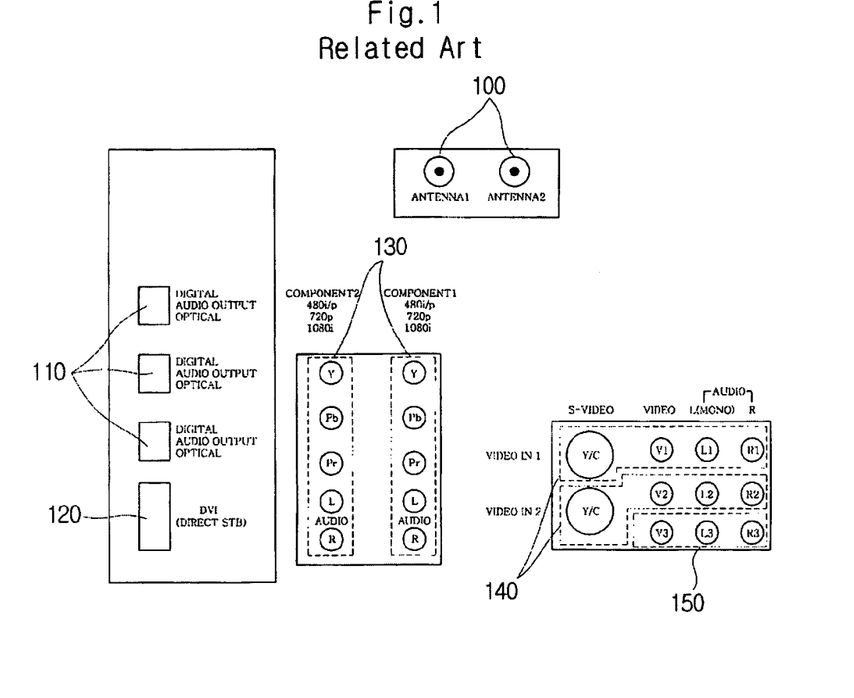
FIG. 1 shows external input terminals provided in a general television set.

FIG. 1 shows external input terminals provided in a general television set.

As shown in FIG. 1, a television set is provided with various external input terminals. In other words, the external input terminals includes an antenna terminal 100, a plurality of digital speech signal input terminals 110, an external input terminal 120, first component terminal sets I and II 130, second component terminal sets I and II 140 and a composite terminal 150. The antenna terminal 100 is used to receive a ratio signal. The plurality of digital speech signal input terminals 110 are used to input an optical digital speech signal. The external input terminal 120 is used to input an external AV signal through a digital video interface (DVI) from a set-top box. The first component terminal sets I and II 130 is used to input an external AV signal as a component signal from an external AV apparatus. The second component terminal sets I and II 140 is used to input an external AV signal of a super video home system (S-VHS) or a video home system (VHS) as a composite signal from an external AV apparatus. The composite terminal 150 receives an external AV signal as a composite signal from a digital video home system (DVHS).

In a related art, when an external AV signal is inputted through one of external input terminals provided in a television set, an image of a inputted external AV signal and the kinds of inputted external AV signals (for example, a DVI signal, a component signal, a composite signal, a video signal, etc.) are displayed on a screen of the television set.

Figure 2:
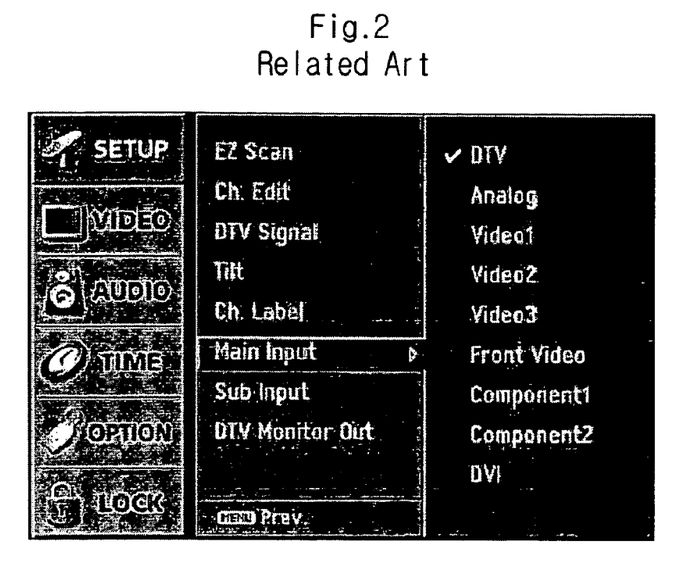
FIG. 2 shows GUI of a television set of FIG. 1.

FIG. 2 shows GUI of a television set of FIG. 1. As shown in FIG. 2, various menus including external AV signals such as an 'Analog', 'Video1', 'Video2', 'Video3', 'Front Video', 'Component1', 'Component2' and 'DVI' are displayed through a graphic mode of graphic user interface (GUI) environment.

Figure 3:
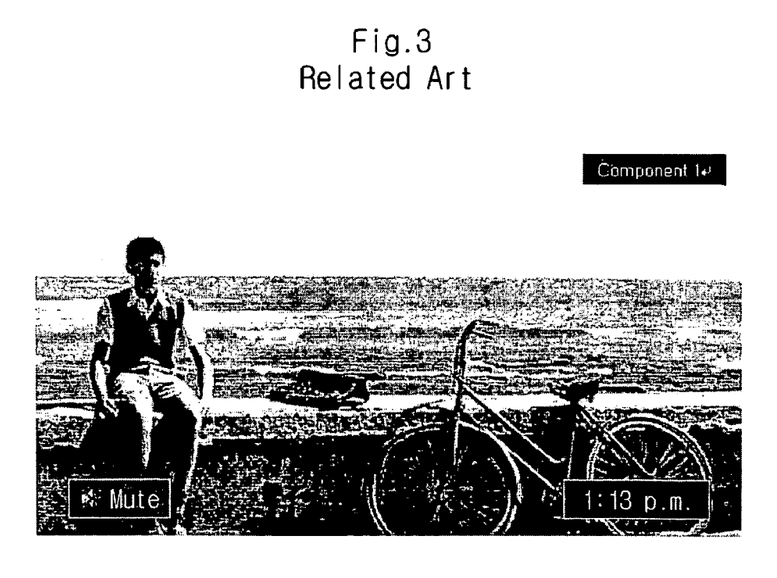
FIG. 3 shows that an external AV signal selected by a user is displayed on a screen of a television set of FIG. 1.

When a user selects one of the external AV signals, the selected external AV signal is displayed on a screen. For example, if the external signal selected by the user is 'Component1', 'Component1' may be displayed on a screen as shown in FIG. 3.

In other words, in the related art, only the kind of an external AV signal is displayed on a screen and the kind of an external AV apparatus is not displayed. Accordingly, when a user wants to watch an image of a desired external AV signal, the user cannot check the kind of an external AV apparatus for outputting a corresponding external AV signal through a screen. Therefore, the user cannot directly select a corresponding external input terminal since the user do not know whether the image of a desired external AV signal is outputted from an external AV apparatus.

Of course, when the user memorises an external AV apparatus connected to an external input terminal of the user's television set, the user selects a corresponding input terminal and an external AV signal from an external AV apparatus is processed by the television set. However, when the television set is provided with various external input terminals and the corresponding various external AV apparatuses are connected to the external input terminals, it is practically impossible for the users to memorize all the external input terminals to which the external AV apparatuses are connected. Meanwhile, the user selects sequentially the external input terminals provided in the television set and can check external AV apparatuses connected to the external terminals. However, whenever the user watches the image of the desired external AV apparatus, it is too inconvenient for the users to sequentially select external input terminals as described above.

SUMMARY OF THE INVENTION

Accordingly, the present invention is directed to a method for marking a label of an external AV apparatus informing of the external AV apparatus and an apparatus using the same, which substantially obviate one or more problems due to limitations and disadvantages of the related art.

An object of the present invention is to provide a method for marking a label of an external AV apparatus and an apparatus using the same, which can inform of the kind of the external AV apparatus and help selecting the external AV input terminal of a user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for marking a label of an external AV apparatus including displaying an external AV signal outputted from the external AV apparatus selected from a plurality of external AV apparatuses by switch-controlling external input terminals connected to the plurality of external AV apparatuses, displaying a label setting signal including a plurality of labels stored beforehand, setting one label of the plurality of labels to be a label of the selected external AV apparatus, and displaying a label of the set external AV apparatus.

In another aspect of the present invention, there is provided a method for marking a label of an external AV apparatus including displaying an external AV signal outputted from the external AV apparatus selected from a plurality of external AV apparatuses by switch-controlling external input terminals connected to the plurality of external AV apparatuses, displaying a label setting signal including an input window stored beforehand, setting a character inputted to the input window to be a label of the selected external AV apparatus, and displaying a label of the set external AV apparatus.

In another aspect of the present invention, there is provided an apparatus for marking a label of an external AV apparatus, including means for switching external input terminals connected to a plurality of external AV apparatuses, means for storing a label setting signal including a plurality of labels, means for setting one label of the plurality of labels to be a label of the selected external AV apparatus, and means for displaying an external AV signal outputted from the external AV apparatus selected by switching means and a label of the set external AV apparatus.

In another aspect of the present invention, there is provided an apparatus for marking a label of an external AV apparatus, including means for switching external input terminals connected to a plurality of external AV apparatuses, means for storing a label setting signal including an input window, means for setting a character inputted to the input window to be a label of the selected external AV apparatus, and means for displaying an external AV signal outputted from the external AV apparatus selected by switching means and a label of the set external AV apparatus.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 4:
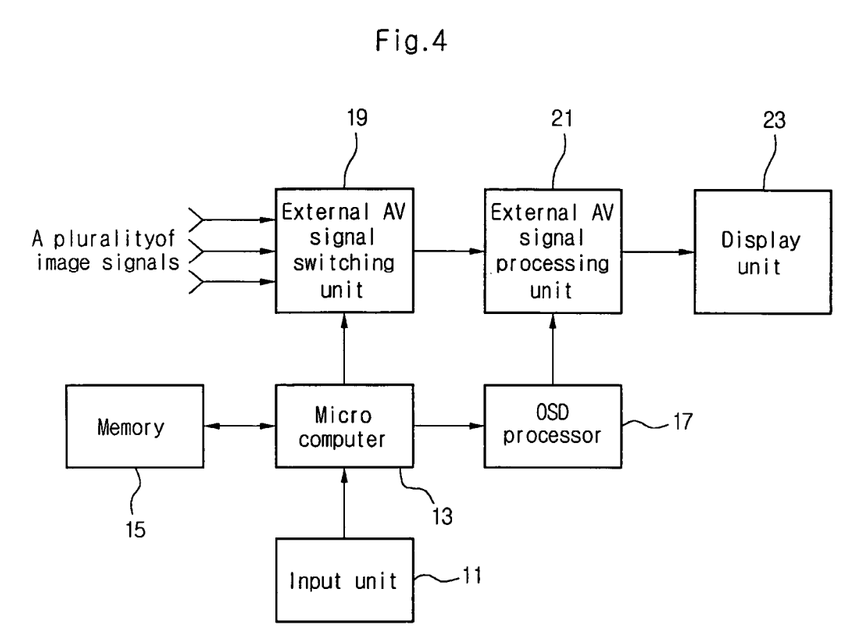
FIG. 4 shows an apparatus of marking a label of an external AV apparatus of an image display apparatus according to a preferred embodiment of the present invention.

FIG. 4 shows an apparatus of marking a label of an external AV apparatus of an image display apparatus according to a preferred embodiment of the present invention. Referring to FIG. 4, the apparatus of marking a label of an external AV apparatus according to the present invention includes an input unit 11, a microcomputer 13, a memory 15, an on-screen display (OSD) processing unit 17, an external AV signal switching unit 19, and external AV signal processing unit 21 and a display unit 23.

The input unit 11 is an interface for receiving an control command according a user's manipulation. The input unit 11 of the present invention receives a command for selecting an external input terminal to which an external AV apparatus for outputting desired external AV signal is connected and a command for setting a label of an external AV apparatus.

The microcomputer 13 selects a corresponding external input terminal according to the selection command provided from the input unit 11 and processes an external AV signal inputted to the selected external input terminal. The microcomputer 13 activates a predetermined label setting signal and displays the predetermined label setting signal according to a label setting command provided from the input unit 11.

The memory 15 includes a flash ROM and a DRAM. The flash ROM stores software related with a system OS. The DRAM stores the label setting signal to be displayed on the screen.

The OSD processing unit 17 activates the label setting signal stored in the memory 15 to cause the display unit 23 to display the label setting signal under the control of the microcomputer 13. In other words, the OSD processor 17 makes the label setting signal into a displaying screen.

The external AV signal switching unit 19 connects an external input terminal corresponding to a selection command provided from the controller by switching so as to provide an external AV signal outputted from the external AV apparatus connected to the external input terminal. A front stage of the external AV signal switching unit 19 is provided a plurality of input terminals. A plurality of external AV apparatuses corresponding to a plurality of input terminals is connected. Accordingly, the external AV signal switching unit 19 switches a plurality of external AV signals outputted from a plurality of input terminals provided in the front stage of the external AV signal switching unit 19 so that only the external AV signal corresponding to the selection command provided form the controller is selected and supplied.

The external AV signal processing unit 21 is switched by the external AV signal switching unit 19 to transform the format of the supplied external AV signal and processes the transformed format to be proper to the screen of the display unit 23. Herein, when the OSD apparatus 17 provides the label setting signal, the external AV signal processor 21 combines the label setting signal with the external AV signal.

The display unit 23 displays an external AV signal and/or a label setting signal provided from the external AV signal processor 21.

Figure 5:
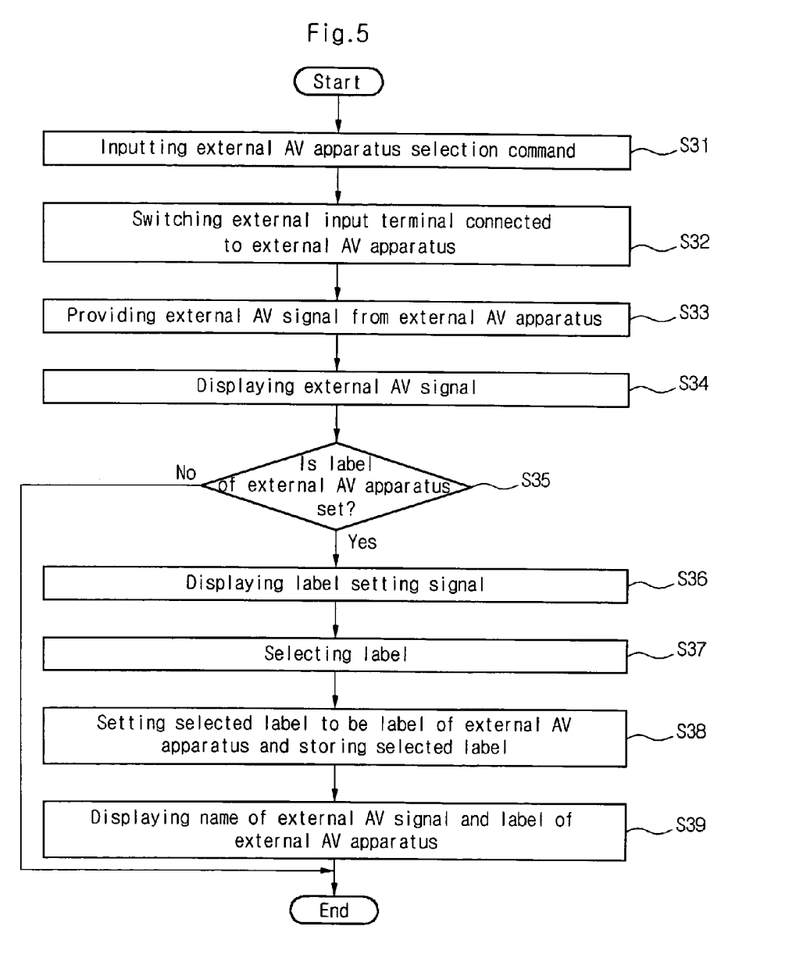
FIG. 5 is a flowchart of a method of marking a label of an external AV apparatus of an image display apparatus according to another preferred embodiment of the present invention.

FIG. 5 is a flowchart of a method of marking a label of an external AV apparatus of an image display apparatus according to another preferred embodiment of the present invention. Referring to FIGS. 4 and 5, when a user commands to select a predetermined external AV apparatus through an input unit 11 (S31), the microcomputer 13 provides the selection command to the external AV signal switching unit 19 and the external AV signal switching unit 19 switches the external input terminal to which the external AV apparatus is connected according to the selection command (S32). Accordingly, the external AV signal outputted from the switched external AV apparatus is provided (S33). The external AV signal processor 21 transforms the format of the external AV signal, and displays the external AV signal on the screen of the display unit 23 (S34).

The user commands to set the label through the input unit 11 so as to set the label of the external AV apparatus that outputted the displayed external AV signal. Accordingly, the controller checks whether to set the label of the external AV apparatus through the label setting command (S35). When the label of the external AV apparatus is set, the controller activates the label setting signal stored in the memory 15 and provides the activated label setting signal to the OSD processor 17 in response to the label setting command. The OSD processor 17 makes the label setting signal into a displaying screen and provides the displaying screen to the external AV signal processing unit 21. The external AV signal processing unit 21 combines the displaying screen with the external AV signal and transforms the format of the combined screen. Then, the combined screen is displayed on the screen of the display unit 23 (S36).

Figure 7:
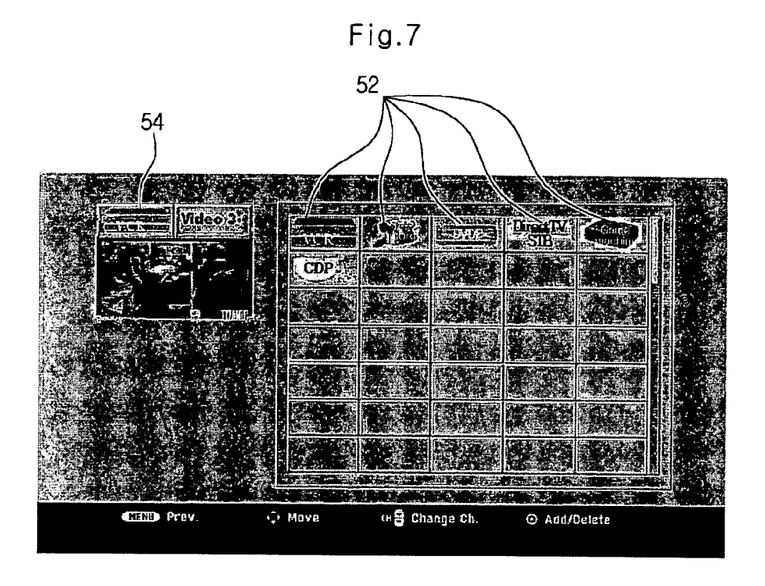
FIG. 7 shows a label setting screen according to another preferred embodiment of the present invention.

The screen on which the label setting signal is displayed may include a plurality of labels 52 and an input window 54 through which characters can be inputted as shown in FIG. 7. Herein, the plurality of labels may include all the external AV apparatuses connected to the external input terminals. Herein, the label may include an image depicting the external AV apparatus and the name of the external AV apparatus.

Figure 8A:
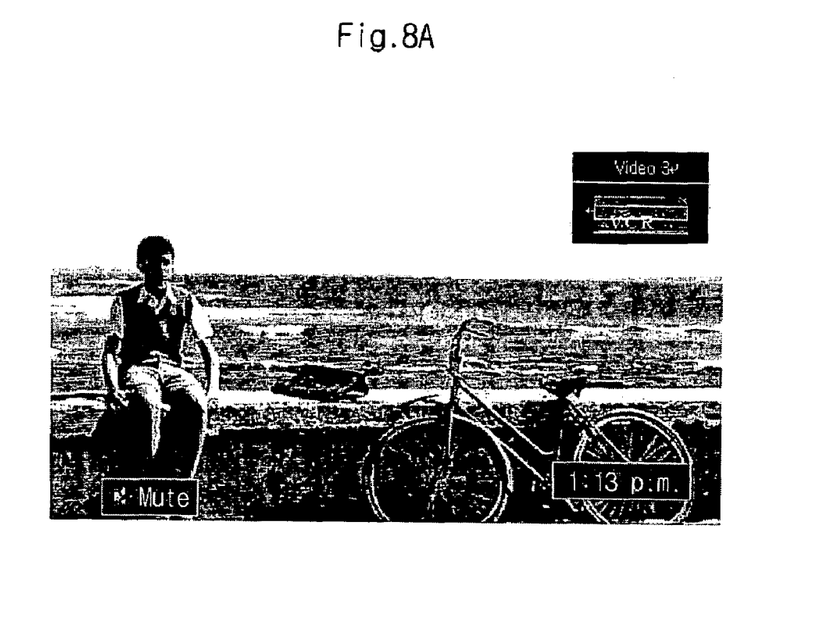
FIGS. 8A and 8B show that a set label is displayed according to another preferred embodiment of the present invention.

The user selects one of the plurality of labels through the input unit 11 (S37). When the user selects one of the plurality of labels, the selected label is set to be the label of the external AV apparatus which has outputted an external AV signal that is currently displayed on the screen (S38). The set label of external AV apparatus can be stored in the memory 15. When the label of the external AV apparatus is set, the microcomputer 13 displays the name of the external AV signal (e.g. 'Video3') and the label of the external AV apparatus (e.g. 'VCR') on the screen from the memory 15 as shown in FIG. 8A.

Figure 6:
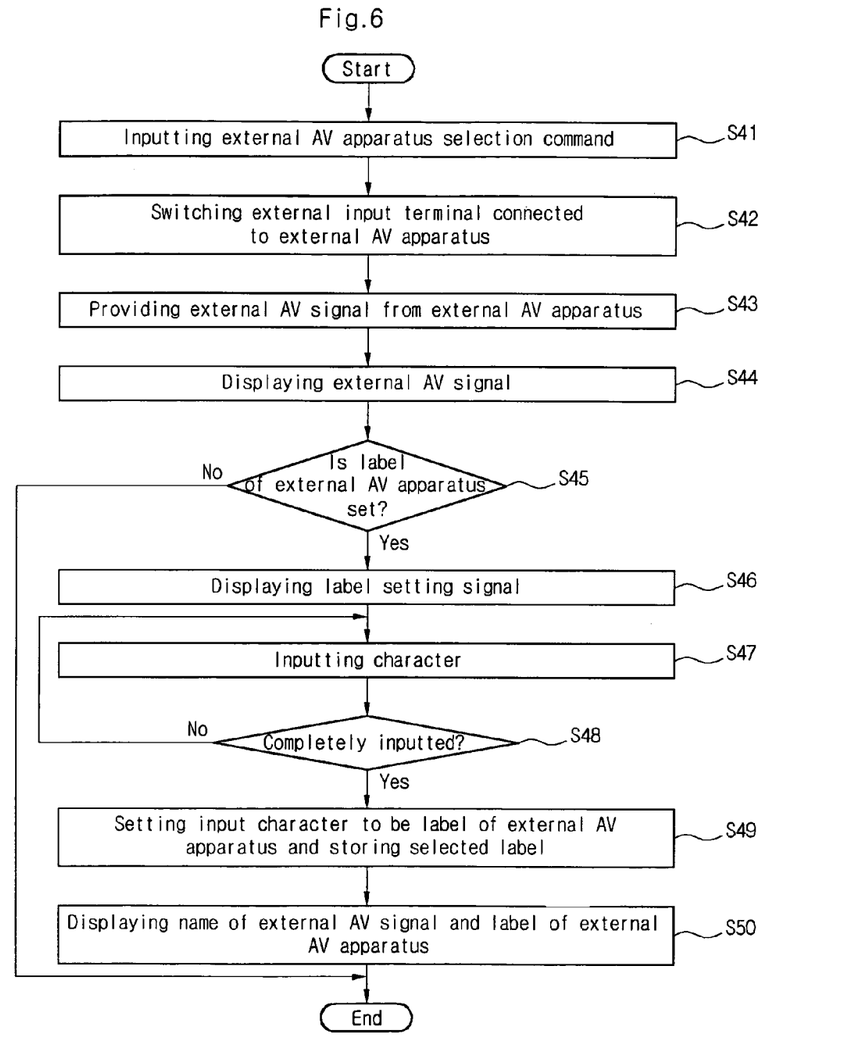
FIG. 6 is a flowchart of a method of marking a label of an external AV apparatus of an image display apparatus according to another preferred embodiment of the present invention.

FIG. 6 is a flowchart of a method of marking a label of an external AV apparatus of an image display apparatus according to another preferred embodiment of the present invention. Referring to FIGS. 4 and 6, when the user commands to select a predetermined external AV apparatus through the input unit 11 (S41), the microcomputer 13 provides the selection command to the external AV signal switching unit 19. The external AV signal switching unit 19 switches the external input terminals to which the external AV apparatus is connected to according to the selection command (S42). Accordingly, the external AV signal outputted from the switched external AV apparatus is provided (S43). The external AV signal processor 21 transforms the format of the external AV signal, and displays the external AV signal on the screen of the display unit 23 (S44).

The user commands to set the label through the input unit 11 so as to set the label of the external AV apparatus that outputted the displayed external AV signal. Accordingly, the controller checks whether to set the label of the external AV apparatus through the label setting command (S45). When the label of the external AV apparatus is set, the controller activates the label setting signal stored in the memory 15 and provides the activated label setting signal to the OSD processor 17 in response to the label setting command. The OSD processor 17 makes the label setting signal into a displaying screen and provides the displaying screen to the external AV signal processing unit 21. The external AV signal processing unit 21 combines the displaying screen with the external AV signal and transforms the format. Then, the combined screen is displayed on the screen of the display unit 23 (S46).

Figure 8B:
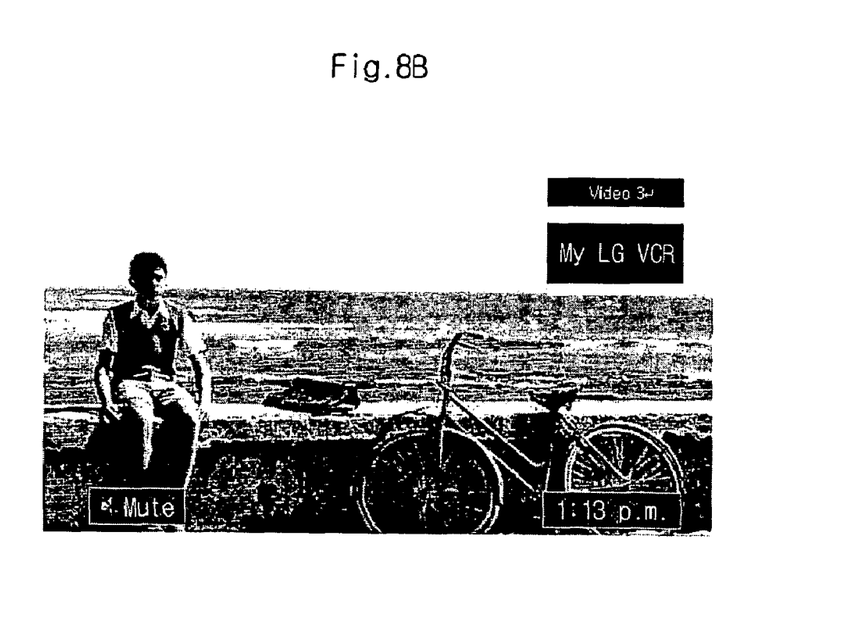

The screen on which the label setting signal is displayed may include a plurality of labels 52 and an input window 54 through which characters can be inputted as shown in FIG. 7. Herein, the plurality of labels may include all the external AV apparatuses connected to the external input terminals. Herein, the label may include an image depicting the external AV apparatus and the name of the external AV apparatus. The user inputs characters to the input window 54 of the label setting signal displayed on the screen through the input unit 11 (S47). In other words, the user places a screen cursor on the input window 54 through the input unit 11 and inputs characters to the input window 54 using character keys. The microcomputer 13 checks whether the characters are completely inputted to the input window 54 (S48). For example, if a user does not input any character for a predetermined time after inputting one character, the microcomputer 13 may determine that the characters are completely inputted. When the characters are completely inputted to the input window, the inputted characters are set to be the label of the external AV apparatus which has outputted an external AV signal that is currently displayed on the screen (S49). The set label of external AV apparatus can be stored in the memory 15. When the label of the external AV apparatus is set, the microcomputer 13 displays the name of the external AV signal (e.g. 'Video3') and the label of the external AV apparatus (e.g. 'my LG VCR') on the screen from the memory 15 as shown in FIG. 8B (S50).

By using characters input, the characters that the user wants to input can be inputted to the label of the various external AV apparatus.

As described above, if the labels are set to each of a plurality of external AV apparatuses, when an external AV signal outputted from the external AV apparatus, which the user wants to watch later, will be displayed, the label of the external AV apparatus and the external AV signal will be able to be automatically displayed together without additional label setting.

In the present invention, it has been described that the label of the external AV apparatus and the external AV signal will be able to be automatically displayed together. However, in embodying the present invention, various modifications can be made, for example, a modification that the name of the external AV signal is not displayed but only the label of the external AV signal is displayed.

As described above, according to the invention, the user easily confirms whether or not the present external AV signal is inputted from any external AV apparatus and selects and watches the external AV signal of the external AV apparatus hopeful to watching by the user.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for marking a label of an external AV apparatus, the method comprising:
   displaying an external AV signal outputted from the external AV apparatus selected from a plurality of external AV apparatuses by switch-controlling external input terminals locally connected to the plurality of external AV apparatuses, each of the plurality of external AV apparatuses being connected to a different external input terminal;
   displaying a label setting signal including a plurality of labels stored beforehand and an input window allowing a user to input characters related to the selected AV apparatus;
   setting one label of the plurality of labels or the input characters to be a label of the selected external AV apparatus;
   displaying the set label of the selected external AV apparatus; and
   displaying a name of the external AV signal outputted from the external AV apparatus together with the label of the set external AV apparatus.

2. The method according to claim 1, further comprising storing the label of the set external AV apparatus.

3. The method according to claim 1, wherein each of the plurality of labels includes an image depicting the external AV apparatus and a name of the external AV apparatus.

4. A method for marking a label of an external AV apparatus, the method comprising:
   displaying an external AV signal outputted from the external AV apparatus selected from a plurality of external AV apparatuses by switch-controlling external input terminals locally connected to the plurality of external AV apparatuses, each of the plurality of external AV apparatuses being connected to a different external input terminal;
   displaying a label setting signal including an input window allowing a user to input characters related to the selected AV apparatus;
   setting a character inputted to the input window to be a label of the selected external AV apparatus;
   displaying the set label of the selected external AV apparatus; and
   displaying a name of the external AV signal outputted from the external AV apparatus together with the label of the set external AV apparatus.

5. The method according to claim 4, further comprising storing the label of the set external AV apparatus.

6. An apparatus for marking a label of an external AV apparatus, the apparatus comprising:
   means for switching external input terminals locally connected to a plurality of external AV apparatuses, each of the plurality of external AV apparatuses being connected to a different external input terminal;
   means for storing a label setting signal including a plurality of labels;
   means for displaying an input window allowing a user to input characters related to the selected AV apparatus;
   means for setting one label of the plurality of labels or the input characters to be a label of the selected external AV apparatus;
   means for displaying an external AV signal outputted from the external AV apparatus selected by switching means and the set label of the selected external AV apparatus; and
   means for displaying a name of the external AV signal outputted from the external AV apparatus together with the label of the set external AV apparatus.

7. The apparatus according to claim 6, wherein the label of the set external AV apparatus is stored in the storing means.

8. The apparatus according to claim 6, wherein each of the plurality of labels includes an image depicting the external AV apparatus and a name of the external AV apparatus.

9. An apparatus for marking a label of an external AV apparatus, the apparatus comprising:
   means for switching external input terminals locally connected to a plurality of external AV apparatuses, each of the plurality of external AV apparatuses being connected to a different external input terminal;
   means for storing a label setting signal including an input window allowing a user to input characters related to the selected AV apparatus;
   means for setting a character inputted to the input window to be a label of the selected external AV apparatus;
   means for displaying an external AV signal outputted from the external AV apparatus selected by the switching means and the set label of the selected external AV apparatus; and
   means for displaying a name of the external AV signal outputted from the external AV apparatus together with the label of the set external AV apparatus.

10. The apparatus according to claim 9, wherein the label of the set external AV apparatus is stored in the storing means.

11. A method for marking a label of an external AV apparatus, the method comprising:
    displaying a label selling On Screen Display (OSD) including a plurality of labels stored beforehand and an input window allowing a user to input characters related to a selected AV apparatus selected from a plurality of external AV apparatuses locally connected to a plurality of external input terminals, each of the plurality of external AV apparatuses being connected to a different external input terminal;
    setting one label of the plurality of labels or the input characters to be a label of the selected external AV apparatus;
    displaying the set label of the selected external AV apparatus and an external AV signal outputted from the selected external AV apparatus; and
    displaying a name of the external AV signal outputted from the external AV apparatus together with the label of the set external AV apparatus.

* * * * *